United States Patent Office 2,955,134
Patented Oct. 4, 1960

2,955,134

SEPARATION OF 1-NAPHTHALENE SULFONIC ACID FROM 2-NAPHTHALENE SULFONIC ACID

Robert J. Tedeschi, Whitehouse Station, N.J., assignor to American Cyanamid Company, New York, N.Y., a corporation of Maine No Drawing. Filed Dec. 31, 1956, Ser. No. 631,418

2 Claims. (Cl. 260—501)

This invention relates to a process for the preparation of 1-naphthol, (alpha-naphthol) and more particularly, to a process for the preparation of 1-naphthalenesulfonic acid by the sulfonation of naphthalene, isolation of the 1-naphthalenesulfonic acid as the ortho-toluidine salt, and conversion to 1-naphthol.

1-naphthalenesulfonic acid and 1-naphthol are important intermediates in the manufacture of dyes and other chemicals. Although 1-naphthol has customarily been made by hydrolysis of 1-naphthylamine, it may also be prepared by an alkali fusion of 1-naphthalenesulfonic acid. The 1-naphthalenesulfonic acid produced by the sulfonation of naphthalene is isolated from the drowned sulfonation mixture, usually as the sodium salt, which is then fused with caustic to produce 1-naphthol. The sodium salt may be isolated by either a salting-out process or by destroying the excess acid in the drowning mixture with lime or calcium carbonate and then treating with sodium carbonate. The sulfonate thus obtained may be used without further purification, but the resulting 1-naphthol which is obtained from the fusion no longer meets commercial demands of purity. U.S. Patent 1,962,137, Cotton, "Production of Alpha Naphthol" describes one such process.

When naphthalene is sulfonated at lower temperatures, that is below about 60° C., the principal product is the 1-sulfonic acid isomer. However, some of the 2-isomer is always formed, sometimes up to 12% or more even when the temperature is kept as low as possible. Higher temperatures favor the increased formation of the 2-isomer. Special conditions, such as set forth in said Cotton patent minimize the formation of the 2-isomer. When the previously known methods are used for isolation, the isolated product contains appreciable amounts of 2-isomer. When this is used in the fushion reaction for the preparation of 1-naphthol, the product is, therefore, contaminated with the 2-naphthol. Aside from impurities, there are other disadvantages to the known methods of isolation of the 1-sulfonic acid derivative as the sodium salt.

As stated above, in the isolation step, the sodium sulfonate of naphthalenesulfonic acid may be obtained by salting out. The drowned mixture may be also treated with lime and the calcium sulfate thus formed removed by filtration; sodium carbonate added to the solution, calcium carbonate removed, again by filtration, and the filtrate evaporated to dryness. Some of the 2-isomer salt present may be removed by treatment with sulfuric acid and magnesium sulfate, the magnesium 2-naphthalene sulfonate then being removed by filtration. It is then necessary to concentrate the filtrate and isolate the sodium salt of the 1-naphthalenesulfonic acid. This evaporation is lengthy and expensive, and regardless of the method used, losses are considerable because of the high solubility of the sodium salt. Also, an excessive amount of 2-isomer is still sometimes present as a contaminant. A better method for isolation of the 1-sulfonic acid derivative with a minimum of the 2-isomer, which method is easy and economical, therefore, is needed.

By the present invention it is found that isolation of the 1-naphthalenesulfonic acid as the ortho-toluidine salt results in a product of high quality and purity, which may readily be converted by caustic fusion to 1-naphthol containing comparatively small amounts of the 2-isomer. By this new method, the 1-sulfonic acid isomer may be easily precipitated in the presence of the 2-isomer, the precipitated product containing a minimum of the 2-isomer. Depending on the conditions and ratios used, the amount of 2-isomer present as a contaminant may be varied at will to give a desired grade of material. The ortho-toluidine salt may be used directly in the alkali metal fusion to give 1-naphthol.

Another advantage to the present process is that the ortho-toluidine may be easily recovered for reuse. Thus, by isolating the 1-isomer by the present process, for use in the caustic fusion, it is possible to obtain alpha-naphthol of high purity containing controlled amounts of the 2-isomer, and the ortho-toluidine may be recovered. Aside from the advantage of being able to control the purity, since for some purposes alpha-naphthol containing an appreciable 2-naphthol content is suitable, a great advantage is the ease of manipulation in isolating the intermediate sulfonic acid.

In common with many procedures involving solubilities the results are not predictable, and the process is surprisingly effective.

While not limited thereto as a theory, in the present instance the facts are not inconsistent with the assumption that a methyl group in the ortho-position on the benzene ring of aniline which forms a salt with 1-naphthalenesulfonic acid, has a steric effect from that methyl group which gives properties to that salt which are uniquely useful in the separation and recovery of the 1-naphthalenesulfonic acid as the ortho-toluidine salt. The ortho-toluidine salt of 2-naphthalenesulfonic acid has a different steric relationship. The methyl group of the ortho-toluidine may thus have a different interaction with the second benzene ring of 2-naphthalenesulfonic acid than with the 1-isomer and thus permit a very specific and uniquely useful separation procedure which is peculiar to the ortho-isomer of toluidine.

Both 1- and 2-naphthalenesulfonic acid are present in the sulfonation mixture from the sulfonation of naphthalene, and to obtain a pure product it is necessary that the 1-isomer be precipitated by the ortho-toluidine with a minimum amount of the 2-isomer if a good separation is to be accomplished. Amines generally form salts with the naphthalenesulfonic acids. However, from published solubility data (see Table I), it could not be predicted that ortho-toluidine could be used for the separation with such excellent results. Other amines such as aliphatic amines are not suitable, either because the salts are too soluble or because insufficient separation of the 1- and 2-isomer results. Other aromatic amines such as aniline or the other isomers of toluidine do not give separations which are satisfactory. Since the purity of the final product would be expected to depend on the relative solubility of the 1- and 2-naphthalenesulfonic acid salts, these solubility relationships are fundamental to the process. The solubility of various salts of the naphthalene sulfonic acids are shown in the following table:

TABLE I

*Solubilities of salts of naphthalenemonosulfonic acids*

| Salt | °C. Temp. | 1-Isomer | 2-Isomer | Solubility Ratio | Reference |
|---|---|---|---|---|---|
| Aniline | 15 | 1.58 | 0.52 | 3.0 | (1) |
| o-Toluidine | 15 | 0.99 | 0.47 | 2.1 | (1) |
| Sodium | 25 | 14.50 | 5.50 | 2.6 | (2) |
| Potassium | 25 | 8.7g./100 ml | 4.0g./100 ml | 2.2 | (3) |

[1] R. B. Forster & O. M. Keyworth, J. Soc. Chem. Ind., 43 299T (1924).
[2] A. Seidell, "Solubilities," volume 1.
[3] Inventors data.

It might be inferred from the data of Table I that none of the salts listed would be valuable for the isolation of 1-naphthalenesulfonic acid since in each case the 1-isomer salt is over twice as soluble as the 2-isomer salt, and hence, the 2-isomer will be preferentially precipitated.

The improvement using ortho-toluidine is best shown by the quality of the 1-naphthol formed by the fusion reaction. The relative improvement is illustrated by a series of experiments in which 1-naphthol was prepared by a fusion process using the 1-naphthalenesulfonic acid isolated from a sulfonation mixture, as the potassium, aniline, and ortho-toluidine salts. The aniline and ortho-toluidine salts were first converted to the sodium salts. The 1-naphthalenesulfonic acid salt in each case was then fused with caustic soda for conversion to 1-naphthol with the following results:

| | Percent Yield | 1-Naphthol Setting Point °C. |
|---|---|---|
| Isolated and fused as the potassium salt | 57 | 85.5 |
| Isolated as the aniline salt and fused as the sodium salt | 55.3 | 85.1 |
| Isolated as the ortho-toluidine salt and fused as the sodium salt | 60 | 89.7 |

Thus, by using ortho-toluidine to isolate the 1-naphthalenesulfonic acid a better yield is obtained based on naphthalene charged to the sulfonation, and the quality and purity are substantially improved as shown by the increase in setting point. Although the increase in yield is not large, even a small increase in yield of a competitive product like 1-naphthol is important. The improvement in purity as shown by the increased setting point represents a further yield increase of the 1-isomer and the increase in purity is most important. The present product meets specifications for which the others fail.

In practice the ortho-toluidine salt may be fused with the caustic directly to form the 1-naphthol or it may first be converted to the sodium salt and then fused. In either case the ortho-toluidine may conveniently be recovered for re-use.

In isolating the ortho-toluidine salt of the 1-naphthalene-sulfonic acid, the amount of 2-isomer may be controlled by varying the temperature and volume of water during the isolation. The purity of the 1-naphthol obtained in the final fusion is considerably higher than that obtained by other methods, even when conditions are used so that a high recovery of the salt results. Thus, in certain cases 1-naphthol is obtained containing about 7% 2-naphthol. This figure can be decreased by isolating the ortho-toluidine salt at a higher temperature or from a larger volume of water. Under the latter conditions, a greater part of the ortho-toluidine salt of the 2-isomer remains in solution.

In the practice of the invention naphthalene is sulfonated at low temperatures (preferably 30-35° C.) using a naphthalene to sulfuric acid ratio of from about 1:2 to about 1:4. At higher temperatures, lower ratios may be used, but the proportion of the 2-isomer increases. For sulfonation at 30-35° C. a sulfuric acid ratio of 1:2.65 to 1:3.3 is preferred.

The use of 99% sulfuric acid as the sulfonating agent is preferred, although acid of from 93% to 100% strength may be used. The sulfonation mixture is drowned in water using at least about 1 liter of drowning water per gram mole of naphthalene for best results. About 1.4 liters of water per gram mole of starting naphthalene gives a very good grade of product. More or less water may be used, however, depending on the purity, or 2-naphthol content permissible, in the final 1-naphthol. Thus for a highly purified grade, a volume of from about 2.4 to about 3 liters is used per gram mole of naphthalene.

The melting point of the ortho-toluidine salt which precipitates may be used as a criterion of purity and a means of determining the approximate content of the 2-isomer.

| Percent 2-naphthol: | Melting point, °C. |
|---|---|
| 0 | 237-8 |
| 1-3 | 232-237 |
| 3-5 | 230-234 |
| 6-8 | 224-231-233 |
| 9-11 | 215-228-230 |

For the precipitation of the ortho-toluidine salt, at least an equivalent of the ortho-toluidine must be used for complete precipitation. An equivalent quantity of ortho-toluidine sulfate or other acid salt may be used. Since the sulfonation yield is not quantitive, approximately 95% of the theoretical amount, based on naphthalene charged, is conveniently used in actual practice. More may be used but it is not necessary. The precipitated ortho-toluidine salt, after filtration and washing, may be used as a moist cake in the fusion process or it may be converted to the sodium salt first. Direct conversion saves labor.

For the fusion, a temperature of about 250-325° C. is used with a temperature range of about 285-300° C. being preferred. From about 3.1 to 4 moles of caustic per mole of naphthalenesulfonic acid salt are used for the fusion; more may be used but it is not needed. One mole less of caustic is required if the sodium salt has already been prepared. Preferably the ortho-toluidene salt is added gradually to the caustic at the fusion temperature. The ortho-toluidine distills readily from the fusion mixture, particularly upon addition of water, and is recovered by condensation. The distillate may be re-used directly for precipitation of 1-naphthalenesulfonic acid, or it may be purified first by conventional means, such as distillation before reuse.

The following examples in which parts are by weight illustrate specific embodiments of the invention.

EXAMPLE 1

A few seed crystals of 1-naphthalenesulfonic acid are added to 260 parts of 100% sulfuric acid in a vessel cooled to 20° C. in a water bath. Then with stirring, 128 parts of 40-mesh naphthalene is added rapidly during the course of 2 or 3 minutes to the sulfuric acid. The temperature tends to rise but is kept below 35° by cooling. Seed crystals of 1-naphthalenesulfonic acid are again added at this point. A thick stirrable slurry forms after a few minutes, this slurry is stirred for 7 hours at a temperature of 30-35° C. The sulfonation mixture is then diluted by adding water in small portions until all of the mixture goes into solution, the temperature meanwhile rising to about 90° C. The mixture is then diluted, with stirring, to 2400 parts with boiling water. To the solution at 85-90° C., is then added, with stirring, 107 parts of ortho-toluidine. A heavy precipitate of the ortho-toluidine salt of the 1-naphthalenesulfonic acid forms almost immediately. After cooling to room temperature and stirring, the solid is removed by filtration, and washed with ice-cold water until the filtrate is free of sulfuric acid, as indicated by tests with barium chloride solution. A moist press cake of the ortho-toluidine salt containing 30-35% water is obtained, which can be used directly for the fusion with caustic to obtain 1-naphthol. The yield of ortho-toluidine salt on a dry basis is 81% of theory. The melting point is 225-233° C. A small amount of ortho-toluidine may be recovered from the mother liquor and washings by liming and then stripping with steam.

The moist press cake of ortho-toluidine salt is then converted to 1-naphthol by fusion with sodium hydroxide. To a fusion pot is charged 152 parts of real sodium hydroxide (96% flake) and 5-10 parts of water. The fusion vessel is heated in a Woods metal bath to a bath temperature of 320-330°, corresponding to an inside fusion pot temperature of 290-300° C. To the stirred molten caustic at a bath temperature of 320-330° C., is added 255 parts (dry weight) of moist ortho-toluidine 1-naphthalenesulfonate containing 30-35% water, slowly over 1¼ to 1½ hours. The amine salt is added in such a way that escape of vapors from the pot is kept to a minimum. During the fusion, the mixture of ortho-toluidine and water which distills off is condensed. The fusion is heated for an additional 20-30 minutes after all the ortho-toluidine salt has been added.

Water is then added very slowly to the molten fusion at a bath temperature of 320-330° C. through a funnel, and the residual ortho-toluidine is steam distilled out, and condensed. The water is added slowly so that the bath temperature is kept above about 320°, and so that solidification of the melt is avoided. Approximately 400 parts of water is added to the fusion to steam strip all of the ortho-toluidine. The completed fusion is then cooled to a bath temperature of 200-260° C. and about 400 parts of water is added, in small portions, bringing the final volume of the dissolved fusion mass to 400-500 parts. The alkaline fusion is then acidified with sulfuric acid to a pH of about 4. After standing, the precipitated 1-naphthol is removed by filtration, and washed free of sulfuric acid and inorganic salts. The 1-naphthol, which boils at 160-162° C. at 20 mm., is further purified by distillation at reduced pressure. A yield of distilled 1-naphthol of 85% is obtainable based on the ortho-toluidine salt used, or 69% as overall yield, based on the naphthalene.

The ortho-toluidine may be separated from the fusion distillate, which has some unreacted naphthalene therein. 500-600 parts of the distillate are warmed to 60-66° C. with stirring and treated gradually with 79.5 parts of 100% sulfuric acid. The slurry of the acid sulfate is stirred at 60-65° C. until all the acid sulfate dissolves. Some naphthalene which remains in the solid form is removed by filtration, and after cooling, the ortho-toluidine acid sulfate is again precipitated. This slurry of ortho-toluidine sulfate may be used to precipitate the 1-naphthalenesulfonic acid in the next sulfonation or the ortho-toluidine may be recovered as such by conventional means such as basifying and steam stripping.

EXAMPLE 2

The sulfonation in each case is carried out as follows: 128 grams of naphthalene is added to 325 grams of 99.5% sulfuric acid and the mixture is held at 30-35° C. for one hour.

(A) *Precipitation as the potassium salt.*—The sulfonation melt is drowned in 750 milliliters of water and 200 grams of potassium sulfate is added. The mixture is heated to 85° C. and then allowed to cool to room temperature. The potassium naphthalene sulfonate which forms is removed by filtration and washed with water. It is then added to 118 grams of molten 90% caustic soda at 270-290° C. The temperature is raised to 320° C. and the melt is then drowned in 1000 milliliters of water. The dissolved melt is neutralized with acid, cooled to room temperature and the precipitated 1-naphthol is removed by filtration, then washed, dried, and vacuum distilled, giving 82.2 grams of product with a setting point of 85.5° C.

(B) *Precipitation as the aniline salt.*—The sulfonation mixture is drowned in 1000 milliliters of water and 88 grams of aniline is added. The resulting precipitate of aniline naphthalene sulfonate is removed by filtration at room temperature and converted to the sodium salt by adding sufficient caustic soda solution to make the mixture alkaline, steam stripping off the aniline, and evaporating the resulting solution to dryness. The sodium naphthalene sulfonate is fused with caustic soda as in "A" above, and the 1-naphthol is isolated, giving 79.8 grams of distilled product with a setting point of 85.1° C.

(C) *Precipitation as the ortho-toluidine salt.*—The sulfonation mixture is drowned in 1000 milliliters of water and 107 grams of o-toluidine is added. The solid salt which precipitates is removed by filtration and converted to the sodium salt as described above in "B." The sodium naphthalene sulfonate is fused with caustic soda and the 1-naphthol is isolated as above in "A" giving 86.6 grams of distilled product with a setting point of 89.7° C.

I claim:

1. In a process for the isolation of 1-naphthalenesulfonic acid as the ortho-toluidine salt from the mixture obtained by sulfonating naphthalene to form a sulfonation mixture containing 1-naphthalenesulfonic acid, and associated therewith as an impurity 2-naphthalenesulfonic acid, and drowning the reaction mixture in water, the combination therewith of the step of reacting the drowned mixture with ortho-toluidine, precipitating 1-naphthalenesulfonic acid as the ortho-toluidine salt, and separating the ortho-toluidine salt of 1-naphthalenesulfonic acid from the mixture.

2. A process for preparing 1-naphthol from naphthalene which comprises: adding naphthalene to sulfuric acid, sulfonating the naphthalene at a temperature below about 60° C. to form a sulfonation mixture containing 1-naphthalene sulfonic acid, and, associated therewith as an impurity, 2-naphthalene sulfonic acid, drowning the reaction mixture in water, adding ortho-toluidine, precipitating 1-naphthalenesulfonic acid as its ortho-toluidine salt, separating the ortho-toluidine 1-naphthalenesulfonate from the reaction mixture, adding said salt to a sodium hydroxide fusion, distilling off and collecting the ortho-toluidine released, and adding said ortho-toluidine to a subsequent batch, cooling the fusion mixture, dissolving the fusion mixture in water, acidifying, and collecting the precipitated 1-naphthol.

References Cited in the file of this patent
UNITED STATES PATENTS

| 1,962,137 | Cotton | June 12, 1934 |
| 1,992,481 | Hasler et al. | Feb. 26, 1935 |